United States Patent [19]
Lauw et al.

[11] Patent Number: 6,053,969
[45] Date of Patent: Apr. 25, 2000

[54] DYE SET FOR IMPROVED COLOR QUALITY FOR INK-JET PRINTERS

[75] Inventors: Hiang P. Lauw; Mary E. Austin; Vladek P. Kasperchik, all of Corvallis, Oreg.

[73] Assignee: Hewlett-Packard Company, Palo Alto, Calif.

[21] Appl. No.: 09/304,011

[22] Filed: Apr. 30, 1999

Related U.S. Application Data

[63] Continuation-in-part of application No. 09/182,826, Oct. 29, 1998.

[51] Int. Cl.⁷ ..................................................... C09D 11/00
[52] U.S. Cl. ..................................... 106/31.27; 106/31.48; 106/31.49
[58] Field of Search ............................. 106/31.49, 31.48, 106/31.29, 31.57

[56] References Cited

U.S. PATENT DOCUMENTS

| | | |
|---|---|---|
| 5,085,698 | 2/1992 | Ma et al. . |
| 5,428,383 | 6/1995 | Shields et al. . |
| 5,534,051 | 7/1996 | Lauw . |
| 5,721,344 | 2/1998 | Baettig . |
| 5,772,742 | 6/1998 | Wang . |
| 5,824,785 | 10/1998 | Baettig et al. . |
| 5,851,273 | 12/1998 | Morris et al. . |
| 5,858,075 | 1/1999 | Deardurff et al. . |
| 5,948,154 | 9/1999 | Hayashi et al. ............ 106/31.48 |

*Primary Examiner*—Mark L. Bell
*Assistant Examiner*—Veronica F. Faison

[57] ABSTRACT

In accordance with the invention inks suitable for use in ink-jet printers and method for using the same are provided. More particularly, inks comprising the present dye set exhibits excellent color performance and lightfastness across a range of media. Furthermore, the dye set enables good reliability in an environment having a relatively high concentration of precipitating agents. This reliability enables the use of precipitation bleed control mechanisms. More specifically, a specific dye set for formulating the yellow, magenta, and cyan inks is disclosed, comprising Acid Yellow 17 and a yellow dye according to Formula I; Acid Red 52 and a magenta dye according to Formula II; and Direct Blue 199 and Acid Blue 9; respectively.

20 Claims, No Drawings

DYE SET FOR IMPROVED COLOR QUALITY FOR INK-JET PRINTERS

CROSS REFERENCE TO RELATED APPLICATIONS

The present application is a continuation-in-part of U.S. patent application Ser. No. 09/182,826, entitled "Ink-Jet Inks With Improved Performance," by Kasperchik, filed Oct. 29, 1998, (Attorney docket number 10981174), and assigned to the assignee of the present invention. The present application is also related to U.S. application Ser. No. 09/304,010, filed herewith, entitled "Inks for Ink-Jet Printers" by Kasperchik et al., filed Apr. 30, 1999 Attorney Docket Number 10990353 also assigned to the assignee of the present invention.

FIELD OF INVENTION

The present invention generally relates to ink-jet printing, and in particular, to a specific dye set suitable for use with plain paper and exhibiting enhanced lightfastness.

BACKGROUND OF INVENTION

Ink-jet printing is a non-impact printing process in which droplets of ink are deposited on a print medium in a particular order to form alphanumeric characters, area-fills, and other patterns thereon. Low cost and high quality of the hardcopy output, combined with relatively noise-free operation, have made ink-jet printers a popular alternative to other types of printers used with computers.

The non-impact printing process of ink-jet printing involves the ejection of fine droplets of ink onto a print medium such as paper, transparency film, or textiles in response to electrical signals generated by a microprocessor. There are two basic means currently available for achieving ink droplet ejection in ink-jet printing: thermally and piezo-electrically. In thermal ink-jet printing, the energy for drop ejection is generated by electrically heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor.

Commercially-available thermal ink-jet printers, such as DeskJet® printers available from Hewlett-Packard Company, use inks of differing hues, namely, magenta, yellow, and cyan, and optionally black. The particular set of colorants, e.g., dyes, used to make the inks is called a "primary dye set." A spectrum of colors, e.g., secondary colors, can be generated using different combinations of the primary dye set.

Any given perceived color can be described using any one of the color spaces, such as CIELAB, and Munsell, as is well known in the art. For example, in the Munsell color space a given color is defined using three terms, Hue, Value, and Chroma. Similarly, in the CIELAB color space, a color is defined using three terms $L^*$, $a^*$, and $b^*$. $L^*$ defines the lightness of a color, and it ranges from zero (black) to 100 (white). The terms $a^*$ and $b^*$, together, define the hue and chroma characteristics of a given color. The term a ranges from a more negative number, green, to a more positive number, red. The term $b^*$ ranges from a more negative number, blue, to a more positive number, yellow. Additional terms such as hue angle (h°) and chroma ($C^*$) are used to further describe a given color, wherein $$h° = \tan^{-1}(b^*/a^*) \quad \text{Equation 1}$$

$$C^* = (a^{*2} + b^{*2})^{1/2} \quad \text{Equation 2}$$

In general, a successful ink set for color ink-jet printing must have the following properties: good crusting resistance, good stability, the proper viscosity, the proper surface tension, good color-to-color bleed alleviation, rapid dry time, no negative reaction with the vehicle, consumer-safety, and low strike-through. When placed into a thermal ink-jet system, the ink set must also be kogation-resistant.

In addition, the ink set must be able to provide printed images having good color characteristics, such as correct hue and high chroma. While formation of colors on plain paper is required, it is also necessary that the ink set be useful on other print media, such as transparency film and coated paper. Another requirement for the ink set is to provide a hard copy output that is lightfast, thus preserving the integrity of the original color information.

While some of these conditions may be met by ink vehicle design, other conditions must be met by the proper selection and combination of the colorants. The selection of the colorants becomes especially important when additional limitations are placed on the choice of the colorants because of other system requirements, such as the color-to-color bleed control mechanism.

Regardless of whether an ink is dye-based or pigment-based, ink-jet inks commonly face the challenge of color-to-color or black-to-color bleed control. The term "bleed," as used herein, is defined to be the invasion of one color into another, once the ink is deposited on the print medium, as evidenced by a ragged border therebetween. Bleed occurs as colors mix both on the surface of the paper substrate as well as within the substrate itself. The occurrence of bleed is especially problematic between a black ink and an adjacently-printed color ink because it is all the more visible. Hence, to achieve good print quality, bleed must be substantially reduced or eliminated such that borders between colors are clean and free from the invasion of one color into the other.

One approach used for controlling bleed between the printed images, as disclosed in U.S. Pat. No. 5,428,383 entitled "Method and apparatus for preventing color bleed in a multi-ink printing system," issued to Shields et. al., is to provide a first ink composition comprising a first colorant; and a second ink composition comprising a second colorant and a precipitating agent (e.g., inorganic salts) which will react with the first colorant in the first ink composition so that upon contact of the first ink and the second ink on the printing medium a precipitate is formed, thus preventing color bleed between the first ink composition and the second ink composition.

To take advantage of the precipitation mechanism for controlling bleed, it becomes important to have a set of inks that can provide all the above performance requirements while maintaining reliability in the presence of precipitating agents.

Therefore, a need exists for a dye set that can provide the appropriate lightfastness and reliability in an environment having a relatively high concentration of precipitating agents.

DISCLOSURE OF THE INVENTION

In accordance with the invention inks suitable for use in ink-jet printers and method for using the same are provided. More particularly, inks comprising the present dye set exhibit excellent color performance and lightfastness across a range of media. Furthermore, the dye set enables good reliability in an environment having a relatively high concentration of precipitating agents. This reliability enables the use of precipitation bleed control mechanisms. More specifically, a specific dye set for formulating the yellow, magenta, and cyan inks is disclosed, comprising Acid Yellow 17 and a yellow dye according to Formula I; Acid Red 52 and a magenta dye according to Formula II; and Direct Blue 199 and Acid Blue 9; respectively.

DETAILED DESCRIPTION OF THE INVENTION

The invention described herein is directed to a specific dye set for printing ink-jet images using commercially available ink-jet printers such as DESKJET® printers, manufactured by Hewlett-Packard Company of Delaware. The dye set enables an ink-jet color printer to produce high quality color images having excellent color performance and lightfastness on a range of media, particularly on plain paper. Furthermore, the dye set enables good reliability, such as ink stability, and decap and recovery (e.g. crusting) in an environment having a relatively high concentration of precipitating agents such as multi-valent metal compound (e.g., metal salt or metal coordination compound).

The present yellow, magenta, and cyan aqueous ink compositions each comprise in general from about 0.05 to about 10 wt % of at least one dye and a vehicle comprising the following components (in wt % of total ink composition): from about 5 to about 20 wt % of at least one organic solvent; 0 to about 5 wt % of an alcohol; 0 to about 1.5 wt % of at least one component independently selected from the group consisting of surfactants, buffers, and biocides. The inks of the present invention, preferably, further comprise a precipitating agent, preferably, a multi-valent metal compound, more preferably, a metal salt.

As described above, the use of precipitating agents, among other forms of reactive chemistry, may be employed to enhance any one of a number of print quality attributes, such as, but not limited to: bleed control between two adjacently printed areas when one area is printed with at least a first ink and the other area is printed with at least a second ink; or when an area is printed, at least partially, with at least the first ink and at least the second ink. It should also be appreciated that the inks formulated according to the present invention, and methods using the same, can be employed in printing adjacent areas and areas that are under or over-printed with the inks employing the present invention.

In a typical application, the first ink containing the multi-valent metal may be used to bring about the immobilization of a colorant in the second ink, wherein the colorant in the second ink comprises at least one second colorant having a functional group that upon contact, for example on the print medium, with the first ink, can associate to form an insoluble salt, complex, or compound; with the precipitating agent (e.g., multi-valent metal), thereby immobilizing the second colorant in the second ink.

All concentrations herein are in weight percent of total ink composition, unless otherwise indicated. The purity of all components is that employed in normal commercial practice for ink-jet inks.

In the practice of the invention, each ink color, namely, yellow, magenta, and cyan can comprise more than one dye load. That is, there can be one or more ink-jet ink supplies filled for each ink color, each supply having a different dye load or a different dye. For example, there can be two cyan supplies, each one containing either or both a different dye load and a different cyan dye.

As used herein, the term "ink", or "first ink" (without specific reference to the term "second ink"), refers to the inks of the present invention.

COLORANT

In selecting the colorants for the dye set of the present invention, the following factors had to be considered: appropriate hue angle and color performance, particularly, on plain paper; good lightfastness; compatibility (stability) in formulations having relatively high inorganic salt content. Of particular importance in the selection of the colorants for the dye set of the present invention was the selection of an appropriate one or more colorants for the yellow ink, such that the one or more colorants would provide a yellow ink preferably having a hue angle between 90 and 95°.

In order to take advantage of the precipitation bleed control mechanism, it was necessary that the dyes were, preferably, also compatible (e.g., stable in the ink vehicle and did not exhibit unwanted precipitation) in environments having relatively high concentration of precipitating agents such as multi-valent metal compounds, particularly metal salts. The colorants in the first ink had to be of a type which will not react with the precipitating agent when these two materials (i.e., colorant and precipitating agent) are formulated in the same ink. More specifically, the colorant in the first ink had to be of a type which remains soluble when formulated with the precipitating agent. This normally results when a colorant is used which does not gain its solubility mainly from carboxyl and/or carboxylate groups, and remains soluble in solutions of moderate to high ionic strength. In other words the dyes should have sufficient solubility in the ink vehicle so that they would not form unwanted levels of precipitate by the precipitating agents. Moreover, the dyes should not react with the precipitant to form unwanted levels of compounds that will, either immediately or over time, drop out of solution. For example the dyes should not form insoluble complexes or salts with the multivalent cation or form salt that have a tendency to form aggregates that have decreased solubility in the ink vehicle over time in such levels as to interfere with the desired performance of the printing system.

The next criterion was lightfastness of the dyes followed by the color gamut on a wide range of media, particularly, plain paper. It was important that the colorants produce highly chromatic printed images having the appropriate hue, especially on plain paper.

It was found that many of the dyes that satisfied the first two requirements, namely, solubility in the presence of precipitating agents and lightfastness, produced printed images that either or both (1) deviated from the ideal hue angle targets on plain paper, and (2) had low chroma on plain paper (see Table IV).

The dye set of the present invention, provides good color gamut on plain paper; good lightfastness; and is compatible in formulations having relatively high inorganic salt content. The dye set of the present invention comprises:

Yellow—Acid Yellow 17 (AY17—available from companies such as Tricon Colors, Inc., Elmwood Park, N.J.); and a yellow dye according to Formula I (available from Ilford AG, Rue de l'Industrie, CH-1700 Fribourg, Switzerland);

Magenta—Acid Red 52 (AR52—available from companies such as Warner-Jenkinson Co., Inc., St. Louis, Mo.); and a magenta dye according to Formula II (available from Ilford AG, Rue de l'Industrie, CH-1700 Fribourg, Switzerland); and Cyan—Direct Blue 199 (DB 199—available from companies such as Zeneca Specialist Colours, New Castle, Del.), and Acid Blue 9 (AB9—available from companies such as Warner-Jenkinson Co., Inc., St. Louis, Mo.).

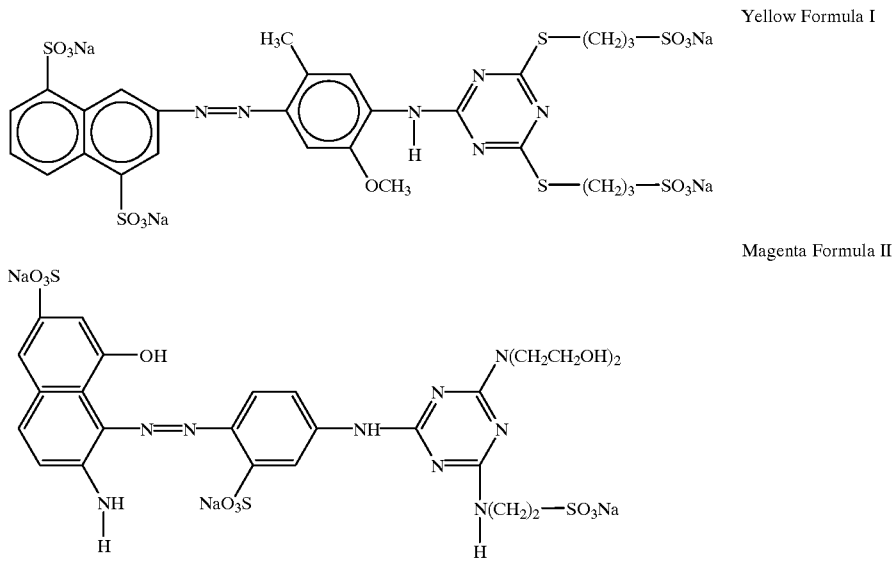

Yellow Formula I

Magenta Formula II

The inks of the present invention comprise from about 0.05 to about 20% dye; preferably, from about 0.1 to about 8%; and more preferably, from about 0.5 to about 5%; by weight, based on the total weight of the ink, based on the sodium form of the dyes. It should be understood that the actual salt form of the dye used in the ink may be different (e.g., the dye may be in the TMA form). The dyes may be in their salt form, such as an alkali metal (Na, K, or Li) or quaternary ammonium. Some of these salt forms, such as Na, are commercially available. Other salt forms can be made using well known techniques.

The preferred weight ratio for the dyes is 1.5:1, 11:4, and 6.5:2.5 for the yellow, magenta, and cyan inks respectively.

The preferred salt forms of the dyes are: Yellow Formula I associated with sodium, and AY17 associated with sodium; Magenta Formula II associated with sodium, and AR52 associated with sodium; and DB199 associated with Tetramethyl ammonium (TMA), and AB9 associated with sodium.

PRECIPITATING AGENT

The precipitating agent is of a type which upon contact (for example on the print medium) reacts with the anionic group (e.g., the anionic group such as carboxyl or sulfonate) associated with a colorant (such as a dye, or a self-stabilized pigment, or the anionic group on a dispersant associated with a dispersed pigment) in the ink (i.e., second ink) composition to form an insoluble salt, complex, or compound. In a preferred embodiment, the precipitating agent will comprise of a multi-valent metal compound, such as a metal salt or metal coordination compound, preferably a metal salt. Exemplary multi-valent metal cations suitable for use in the multi-valent metal compound include the following cations listed below in Table I:

TABLE I

| Multi-valent metal cation groups | Multi-valent metal cations |
|---|---|
| Transition metals | $Cr^{+3}$, $Mn^{+2}$, $Fe^{+2}$, $Fe^{+3}$, $Co^{+3}$, $Ni^{+2}$, $Cu^{+2}$, $Zn^{+2}$, $Y^{+3}$, $Cd^{+2}$ |
| Group IIA metals | $Mg^{+2}$, $Ca^{+2}$, $Sr^{+2}$, $Ba^{+2}$ |
| Group IIIA metals | $Al^{+3}$, $Ga^{+3}$, $In^{+3}$ |
| Lanthanoid metals | $La^{+3}$, $Pr^{+3}$, $Nd^{+3}$, $Sm^{+3}$, $Eu^{+3}$, $Gd^{+2}$, $Tb^{+3}$, $Dy^{+2}$, $Ho^{+3}$, $Er^{+3}$, $Tm^{+3}$, $Yb^{+3}$, $Lu^{+3}$ |

Preferred metal cations suitable for use in the multi-valent metal compound include, but are not limited to, $Zn^{+2}$, $Mg^{+2}$, $Ca^{+2}$, $Cu^{+2}$, $Co^{+2}$, $Ni^{+2}$, $Fe^{+2}$, $La^{+3}$, $Nd^{+3}$, $Y^{+3}$, and $Al^{+3}$. Exemplary anions which may be coupled with these cations include but are not limited to $NO_3^-$, $F^-$, $Cl^-$, $Br^-$, $I^-$, $CH_3COO^-$, and $SO_4^{-2}$.

Furthermore, the metal compound may be a metallic coordination compound. The compound generally refers to compounds in which a metallic ion is surrounded by an electron donor, i.e. ligand, which is capable of coordinating with the metallic ion. Elements composing the ligand, which are capable of coordinating with the metallic ion, are limited to the group V and VI elements in the periodic table. Typical elements are N, O, P, and S. Metallic coordination compounds containing nitrogen and oxygen atoms in the ligand are preferably used in the present invention.

The ligands composed of these elements are classified into two categories: unidentate ligands having one electron donor group per ligand or molecule, and multidentate ligands having two or more electron donor groups per ligand or molecule. Table II shows examples of ligands classified by the coordination number.

TABLE II

| Coordination Number | Ligand |
| --- | --- |
| 1 | Ammonia |
| 1 | Water |
| 1 | Acetic acid |
| 1 | Halogens |
| 2 | Glycine |
| 2 | Ethylenediamine |
| 2 | Propylenediamine |
| 2 | Lactic acid |
| 3 | Iminodiacetic acid |
| 3 | Diethylenetriamine |
| 4 | Dihydroxyethylglycine |
| 4 | Hydroxyethyliminodiacetic acid |
| 4 | Nitrilotriacetic acid |
| 5 | Ethylenediaminetetraacetic acid |
| 5 | Hydroxyethylethylenediaminetetraacetic acid |
| 6 | Diethylenetriaminepentaacetic acid |
| 7 | Triethylenetetraminehexaacetic acid |

Among these, metallic coordination compounds having ligands of a coordination number of 2 or more are desirably used in the present invention. Preferred metallic coordination compounds have ligands of a coordination number of 3 or more. However, any other metallic coordination compound having a ligand of a coordination number of 2 or more, other than compounds shown in Table II, may also be suitably used without restriction.

Accordingly, preferred multi-valent metal salts derived from the above-described cations and anions include but are not limited to: $Ca(NO_3)_2$, $CaCl_2$, $Ca(CH_3COO)_2$, $Al(NO_3)_3$, $Nd(NO_3)_3$, $Y(NO_3)_3$, $Cu(NO_3)_2$, $CuCl_2$, $CoCl_2$, $Co(NO_3)_2$, $NiCl_2$, $Ni(NO_3)_2$, $MgCl_2$, $MgBr_2$, $MgSO_4$, $Mg(CH_3COO)_2$, and $Mg(NO_3)_2$. It should be noted that other multi-valent metal salts derived from the above-listed cations and anions may also be prepared and used in the manner described herein. However, when selecting the appropriate multi-valent metal salt, the exercise of basic chemical techniques will dictate which compounds are most appropriate and which are not. For example, it is well known in the art that $AlCl_3$ produces a violent reaction when combined with water (e.g. the production of HCl gas). Thus, a reasonable and skilled chemist would conclude that this material would not be especially desirable for use in the present invention. Likewise, the desirability of other multi-valent metal salts or coordination compound may also be determined in this manner. It should further be noted that in certain instances, the pH of the ink may be adjusted, depending on the specific metal compound, e.g. metal salt, being used in the ink. Specifically, a side reaction may occur in which the metal cations in the ink form insoluble metal hydroxides if the pH of the ink is too high. Preliminary pilot tests with the selected ink compositions will provide an indication as to whether this situation will occur. If necessary, the side reaction may be controlled by adjusting the pH of the ink downward using a selected acid (e.g. $HNO_3$). The amount and type of pH adjusting agent, as well as the general need for pH adjustments with respect to the ink are all determined using pilot tests as noted above, in conjunction with the exercise of routine chemical procedures which are well known in the art.

In a preferred embodiment, the ink will further comprise from about 0.3 to about 40% by weight multi-valent metal compound, preferably, from about 1 to about 15%, and most preferably from about 0.5 to about 5%.

AQUEOUS VEHICLE

The aqueous carrier medium is water or a mixture of water and at least one water-soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

In the case of a mixture of water and at least one water-soluble solvent, the aqueous carrier medium usually comprises from about 30% to about 95% water. The preferred compositions are about 60% to about 95% water, based on the total weight of the aqueous carrier medium.

The amount of aqueous carrier medium in the ink is in the range from about 70 to about 99.8%, preferably from about 94 to about 99.8%, based on total weight of the ink when an organic pigment is selected; from about 25 to about 99.8%, preferably from about 70 to 99.8%, based on total weight of the ink when an inorganic pigment is selected; and from about 80 to about 99.8% when a dye is selected as the colorant.

ADDITIONAL COMPONENTS

Consistent with the requirements for this invention, various types of additives, as is commonly practiced in the art, may be employed in the inks to optimize the properties of the ink compositions for specific applications.

EXAMPLES

Inks were formulated and different qualities of the formulated inks were measured in an effort to assess the benefits attained in the practice of the invention, namely, effect of yellow dye on color hue angle, chroma, and lightfastness; specifically on plain paper. Furthermore, the formulated inks were evaluated for stability in the presence of high inorganic salts and were compared against environmental requirements (such as Blue Angel).

STABILITY AND RELIABILITY DETERMINATION

Inks were formulated and their stability was determined by accelerating the aging process by subjecting the ink samples to high temperature cycling and thereafter evaluating the inks for print performance and unwanted precipitation.

The inks were supplied to ink-jet printheads and used to generate print samples. The amount of printhead servicing (such as spitting, wiping, and priming) that was required to keep the printheads from having any adverse impact on image quality (because of missing or misdirected nozzles due to crusting) was determined. It was desired that the time to and between servicings be minimized to enable the print system to reach its maximum print performance and speed.

PRINT SAMPLE GENERATION

Print samples of formulated inks, where necessary, were generated using a Hewlett-Packard DeskJet® printer. The print media used included uncoated paper such as Gilbert Bond paper manufactured by Mead; and HP's photo glossy media for DeskJet® Printers.

EFFECT OF YELLOW DYE COLOR QUALITY

Hue angle (h°) and Chroma (C) for each of the yellow inks (comprising one or more yellow dyes) was determined by dissolving about 1 to about 5 wt % of the dye in the desired ink vehicle. The desired absorbance at the lambda maximum for each ink was about 0.15 for a 1:10,000 dilution. A color block for each ink was printed at full density on plain paper. The $L^*$, $a^*$, and $b^*$ values were measured using a commercially available colorimeter such as Hunter Ultrascan available from Hunter Associates Laboratories, Reston, Va., USA. The hue angle and chroma were then calculated according to Equations 1 and 2, above, respectively, and the data is reported in Table III, below.

It is desirable that the yellow ink exhibit a hue angle from about 85 to about 100, more preferably, from about 90 to about 95; and a chroma of at least 75 (on plain paper). As evidenced by the data in Table III, the ink set comprising yellow inks comprising AY 17 and Yellow Dye of Formula I exhibited the desired hue angle and chroma.

EFFECT OF YELLOW DYE ON LIGHTFASTNESS

Lightfastness was measured by printing a color palette on two sheets for each ink, on one or more media, using the printing method described above. One of the print samples for each of the ink/media combination was placed in the dark and the other was exposed to a predetermined amount of klux using standard techniques. Lightfastness for each sample was calculated using the Wilhelm criteria. The lightfastness data is reported in Table III, as the number of years to exceed a 30% loss of optical density for a square with a starting optical density of 0.5. It is desirable that the yellow ink exhibits a lightfastness of at least 5 years. Furthermore, it is desirable that the inks meet environmental regulations as well as providing the appropriate hue angle. As evidenced by the date in Table III, the ink set comprising yellow inks comprising AY 17 and Yellow dye of Formula I exhibited the desired lightfastness, salt compatibility, and hue angle.

Table III

| Dyes used in the Yellow Inks | Hue Angle on Plain Paper | Chroma on Plain Paper | Light-fastness on HP Photo Glossy | Compatibility with Precipitating Agent | Environ-mental Considera-tions |
|---|---|---|---|---|---|
| DY132 | 90–95 | 70–75 | >5 yrs | Incompatible | — |
| DY 86 | 85–90 | 70–75 | >5 yrs | Incompatible | — |
| AY23 | 95–100 | 85–90 | <5 yrs | Compatible | DNMR in TMA form |
| AY17 | 100–105 | 70–75 | >5 yrs | Compatible | Compatible |
| Yellow of Formula I | 80–85 | 75–80 | >5 yrs | Compatible | Compatible |
| Yellow of Formula I + AY17 | 91 | 75 | >5 yrs | Compatible | Compatible |

DNMR = does not meet requirement.

Thus, there has been disclosed a dye set for formulating yellow, magenta, and cyan inks; the dye set comprising Acid Yellow 17 and a yellow dye according to Formula I; Acid Red 52 and a magenta dye according to Formula II; and Direct Blue 199 and Acid Blue 9; respectively. It will be readily apparent to those skilled in the art that various changes and modifications of an obvious nature may be made without departing from the spirit of the invention. All such changes and modifications are considered to fall within the scope of the invention as defined by the appended claims.

What is claimed is:

1. A dye set for formulating ink-jet inks, the set comprising:

Acid Yellow 17 and a yellow dye having Formula I

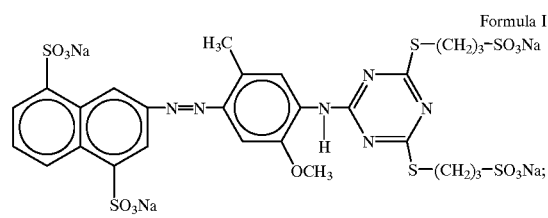

at least one magenta dye; and at least one cyan dye.

2. The dye set of claim 1 wherein the at least one magenta dye comprises Acid Red 52 and a magenta dye having formula II; and

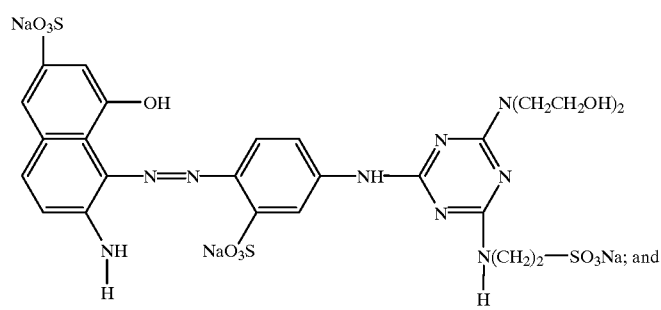

the at least one cyan dye comprises Direct Blue 199 and Acid Blue 9.

3. An ink-jet ink set comprising:

a yellow ink comprising Acid Yellow 17 and a yellow dye having Formula I

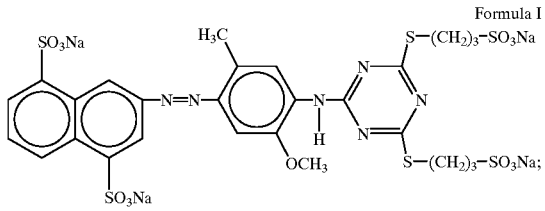

Formula I a magenta ink comprising at least one magenta dye; and a cyan ink comprising at least one cyan dye.

4. The ink set of claim 3 wherein the magenta ink comprises Acid Red 52 and a magenta dye having a formula II; and

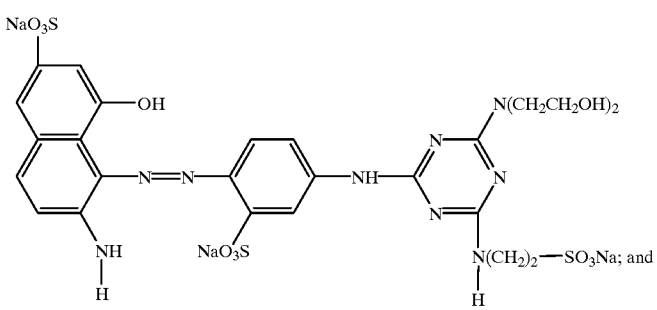

Formula II the cyan ink comprises Direct Blue 199 and Acid Blue 9.

5. The ink set of claim 3 wherein the weight ratio of the Yellow I to AY17 is 1.5:1.

6. The ink set of claim 5 wherein the weight ratio of the Magenta II to AR52 is 11:4.

7. The ink set of claim 4 wherein each ink comprises from at least 0.05 to about 20 weight % total dye.

8. The ink set of claim 4 wherein each ink comprises from at least 0.1 to about 8 weight % total dye.

9. The ink set of claim 4 wherein each ink comprises from at least 0.5 to about 5 weight % total dye.

10. The ink set of claim 4 wherein at least one ink further comprises at least one precipitating agent.

11. The ink set of claim 10 wherein the precipitating agent is a multi-valent metal compound selected from the group consisting of metal salts and metal coordination compounds.

12. A method for printing using an ink-jet printer, comprising printing from a set of ink-jet inks onto a printing medium, said ink set comprising:

a yellow ink comprising Acid Yellow 17 and a yellow dye having Formula I

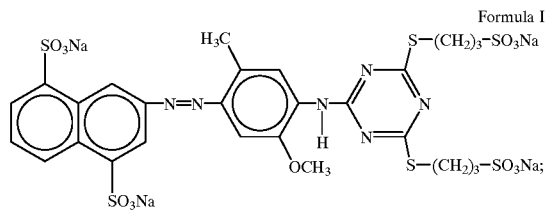

Formula I a magenta ink comprising at least one magenta dye; and a cyan ink comprising at least one cyan dye.

13. The method of claim 12 wherein the magenta ink comprises Acid Red 52 and a magenta dye having formula II; and

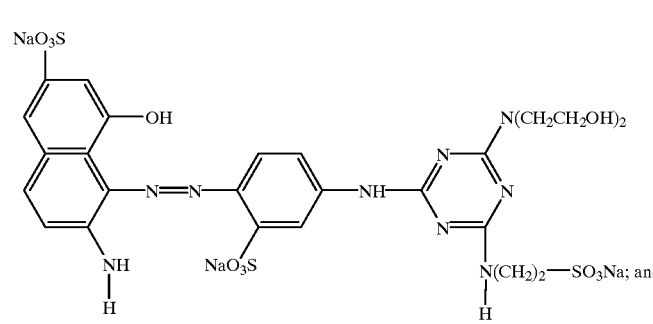

Formula II the cyan ink comprises Direct Blue 199 and Acid Blue 9.

14. The method of claim 12 wherein the weight ratio of the Yellow I to AY17 is 1.5:1.

15. The method of claim 14 wherein the weight ratio of the Magenta II to AR52 is 11:4.

16. The method of claim 13 wherein each ink comprises from at least 0.05 to about 20 weight % total dye.

17. The method of claim 13 wherein each ink comprises from at least 0.1 to about 8 weight % total dye.

18. The method of claim 13 wherein each ink comprises from at least 0.5 to about 5 weight % total dye.

19. The method of claim 13 wherein at least one ink further comprises at least one precipitating agent.

20. The method of claim 19 wherein the precipitating agent is a multi-valent metal compound selected from the group consisting of metal salts and metal coordination compounds.

* * * * *